United States Patent
Browning

(10) Patent No.: US 6,707,581 B1
(45) Date of Patent: Mar. 16, 2004

(54) REMOTE INFORMATION ACCESS SYSTEM WHICH UTILIZES HANDHELD SCANNER

(76) Inventor: Denton R. Browning, 2405 Lakeshire Dr., Alexandria, VA (US) 22308

( * ) Notice: Subject to any disclaimer, the term of this patent is extended or adjusted under 35 U.S.C. 154(b) by 632 days.

(21) Appl. No.: 09/604,674

(22) Filed: Jun. 27, 2000

Related U.S. Application Data

(63) Continuation-in-part of application No. 08/931,885, filed on Sep. 17, 1997, now Pat. No. 6,081,629.

(51) Int. Cl.[7] .............................................. H04N 1/024
(52) U.S. Cl. ................. 358/473; 455/556.2; 455/556.1; 382/313; 382/321
(58) Field of Search ................................. 358/474, 505, 358/513, 403, 473; 382/313, 321; 455/556.2, 556.1

(56) References Cited

U.S. PATENT DOCUMENTS

| | | | |
|---|---|---|---|
| 4,947,261 A | 8/1990 | Ishikawa et al. | 358/285 |
| 5,083,218 A | 1/1992 | Takasu et al. | 358/473 |
| 5,301,243 A | 4/1994 | Olschafskie et al. | 382/59 |
| 5,574,804 A | 11/1996 | Olschafskie et al. | 382/313 |
| 5,595,445 A | 1/1997 | Bobry | 400/88 |
| 5,663,808 A | 9/1997 | Park | 358/440 |
| 5,799,219 A | 8/1998 | Moghadam et al. | 396/319 |
| 5,835,732 A * | 11/1998 | Kikinis et al. | 710/303 |
| 5,837,987 A | 11/1998 | Koenck et al. | 235/462 |
| 5,905,248 A * | 5/1999 | Russel et al. | 235/462 |
| 5,905,251 A | 5/1999 | Knowles | |
| 5,986,670 A * | 11/1999 | Driest et al. | 345/435 |
| 6,105,004 A * | 8/2000 | Halperin et al. | 705/20 |
| 6,427,078 B1 * | 7/2002 | Wilska et al. | 455/550.1 |
| 2001/0008000 A1 * | 7/2001 | Kikinis et al. | 710/100 |
| 2003/0181168 A1 * | 9/2003 | Herrod et al. | 455/90.3 |

FOREIGN PATENT DOCUMENTS

| | | |
|---|---|---|
| EP | 0 856 812 A2 | 8/1998 |
| GB | 2 328 304 A | 2/1999 |
| WO | WO 00/28455 A1 | 5/2000 |

* cited by examiner

*Primary Examiner*—Kimberly Williams
*Assistant Examiner*—N Worku
(74) *Attorney, Agent, or Firm*—Burns, Doane, Swecker & Mathis, L.L.P.

(57) ABSTRACT

A handheld device scans a line of information in the form of Internet URL's, Internet protocol addresses, Internet e-mail addresses, FTP sites, USENET news group addresses, DNS addresses and bar codes as they occur in print advertising and printed media. The scanned information is decoded and displayed for user verification. The device utilizes onboard information retrieval software that establishes a connection to the Internet to retrieve HTML, XML, WML, and VRML documents, e-mail messages, USENET news, Java applets, ActiveX documents, Active Server Pages, or file transfers from the Internet locations interpreted by the handheld scanner.

15 Claims, 6 Drawing Sheets

REMOTE INFORMATION ACCESS SYSTEM WHICH UTILIZES HANDHELD SCANNER

CROSS-REFERENCE TO RELATED APPLICATION

This is a continuation-in-part of U.S. patent application Ser. No. 08/931,885, filed Sep. 17, 1997, now U.S. Pat. No. 6,081,029 the disclosure of which is incorporated herein by reference.

BACKGROUND OF INVENTION

The present invention is directed to the use of handheld scanners as a means of gathering information. In general, handheld scanners can be classified as general purpose or special purpose. Most handheld scanners used for acquiring information from printed media are directed to general purpose uses, so that they can read and store a variety of different types of image information designed for various applications. Recent developments directed to these general purpose scanners concern themselves with eliminating distortion before sending images for processing on to other devices. Because of storage requirements of images, most scanners utilize plug-in modules to store images, or are limited to small numbers of images before transmission is necessary. The other category of handheld scanners is directed to the scanning of very specific types of images to provided a particular form of information. The best known type of scanner in this category is a bar-code scanner, which might be used to obtain the identification of a product which carries the bar code image, for instance to provide inventory control and/or pricing information.

This invention is directed to a more special-purpose type of scanner system which comprises the combination of a handheld scanner and associated information retrieval software. The scanner is capable of scanning a line of information, such as text or barcoded data, and presenting that information to the companion information retrieval software. In the case of scanned text, an image of the text can first be presented to an on-board OCR engine, allowing user display and verification before the information is provided to the information retrieval software. In the case of barcoded data, an image of the data can be presented to decoding software which converts the image into numeric or alphanumeric data before presentation to the information retrieval software.

One particular application of the present invention is the scanning of an address, or other identification, of a site that is accessible via a communications network such as the Internet, and subsequent connection of a communications device to that site. To this end, the invention relates to method of scanning, decoding, storage and transmission of connection information to a communications agent, for connection to a site identified by the scanned data. In one aspect thereof, the invention relates to a system comprising the combination of scanner, image decoding technology, liquid crystal display and wireless communication embodied in a handheld apparatus for the purpose of scanning one line of data, processing the scanned image with the decoding technology and immediately displaying information relating to the scanned data on the LCD panel for user viewing. The system of the invention can utilize the information obtained by the handheld scanner to communicate via the Internet, e.g. through a browser program, for the retrieval of documents in the HyperText Markup Language (HTML), the eXtended Markup Language (XML), the Wireless Markup Language (WML), the Virtual Reality Modeling Language (VRML), or other such information.

SUMMARY

The objective of this invention contemplates a handheld device that scans a line of information in the form of Internet URL's, Internet protocol addresses, Internet e-mail addresses, FTP sites, USENET news group addresses, DNS addresses, bar-coded product identifications, etc., as they occur in printed media. Scanned image data is processed with decoding technology, and can be displayed for user verification where appropriate. The device utilizes the scanned information to connect to the Internet, to send/retrieve HTML, XML, WML or VRML documents, e-mail messages, USENET news, Java applets, ActiveX documents, Active Server Pages (ASP) or file transfers to/from the Internet location decoded by the handheld scanner. Alternatively, the scanned information can be used to retrieve data which is stored in the handheld scanner itself, or in another component of the system that is associated with the handheld scanner.

DETAILED DESCRIPTION

Generally speaking, the present invention is comprised of two main components, namely (1) a handheld scanner which is used to read and process a limited amount of image data that identifies a source of information which is remote from the data itself, such as a Uniform Resource Location (URL), an e-mail address or a product identification, and (2) information retrieval software which is an executable program that retrieves the information from the remote source. The information retrieval software can be entirely incorporated within the handheld scanner, or can be contained in a device which is separate from the scanner and that receives the scanned information from the scanner.

Figure 1:
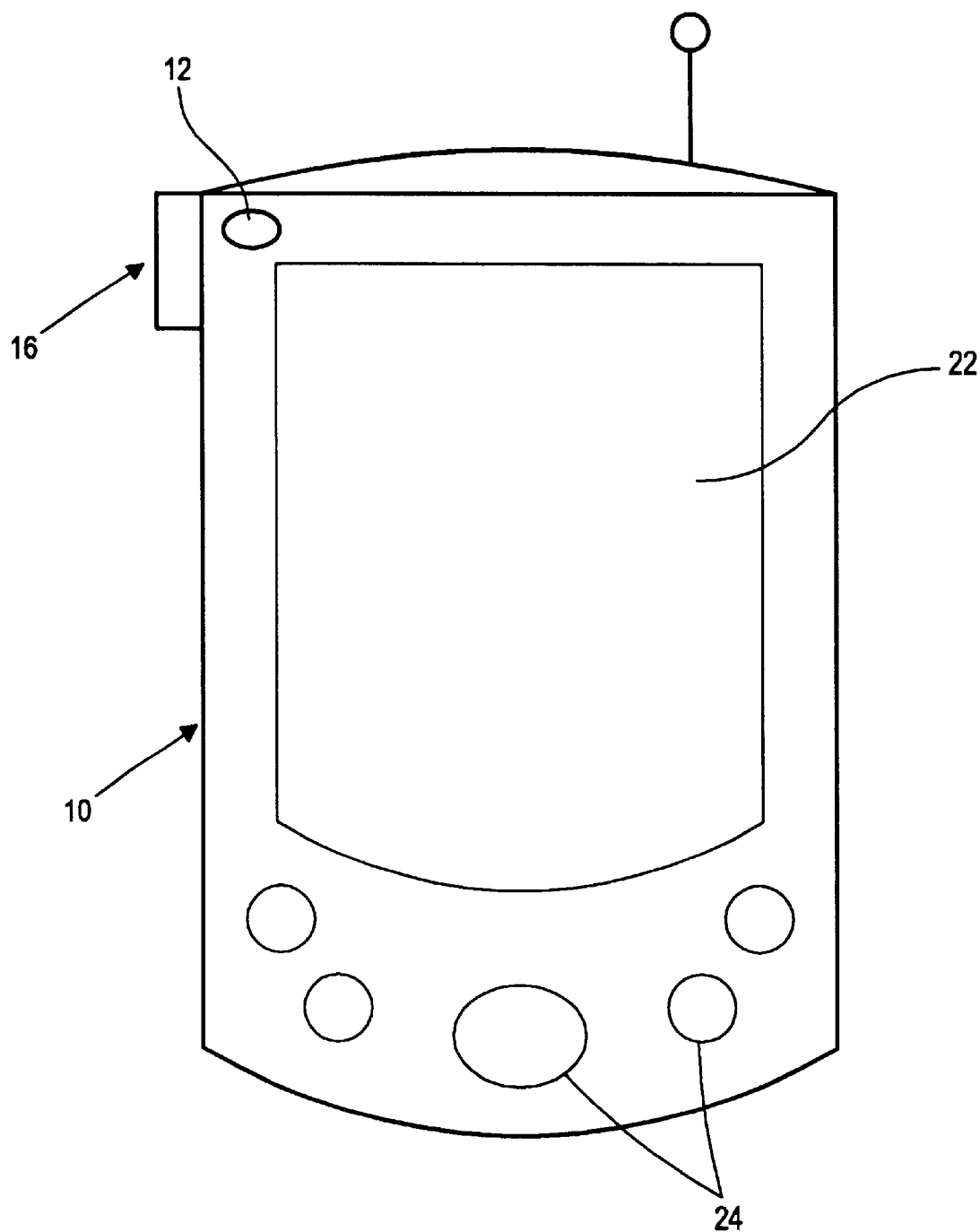
FIG. 1 is top view of an embodiment of a handheld scanner according to the present invention.
Figure 2:
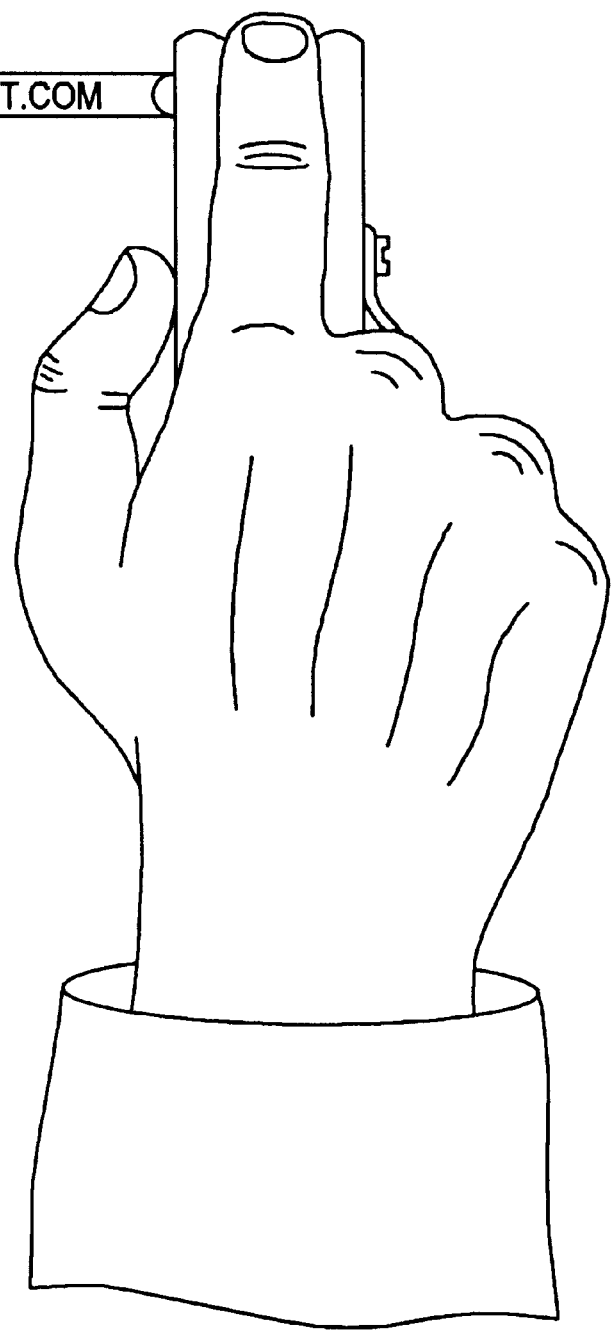
FIG. 2 is a view of another embodiment of the scanner in use.
Figure 3:
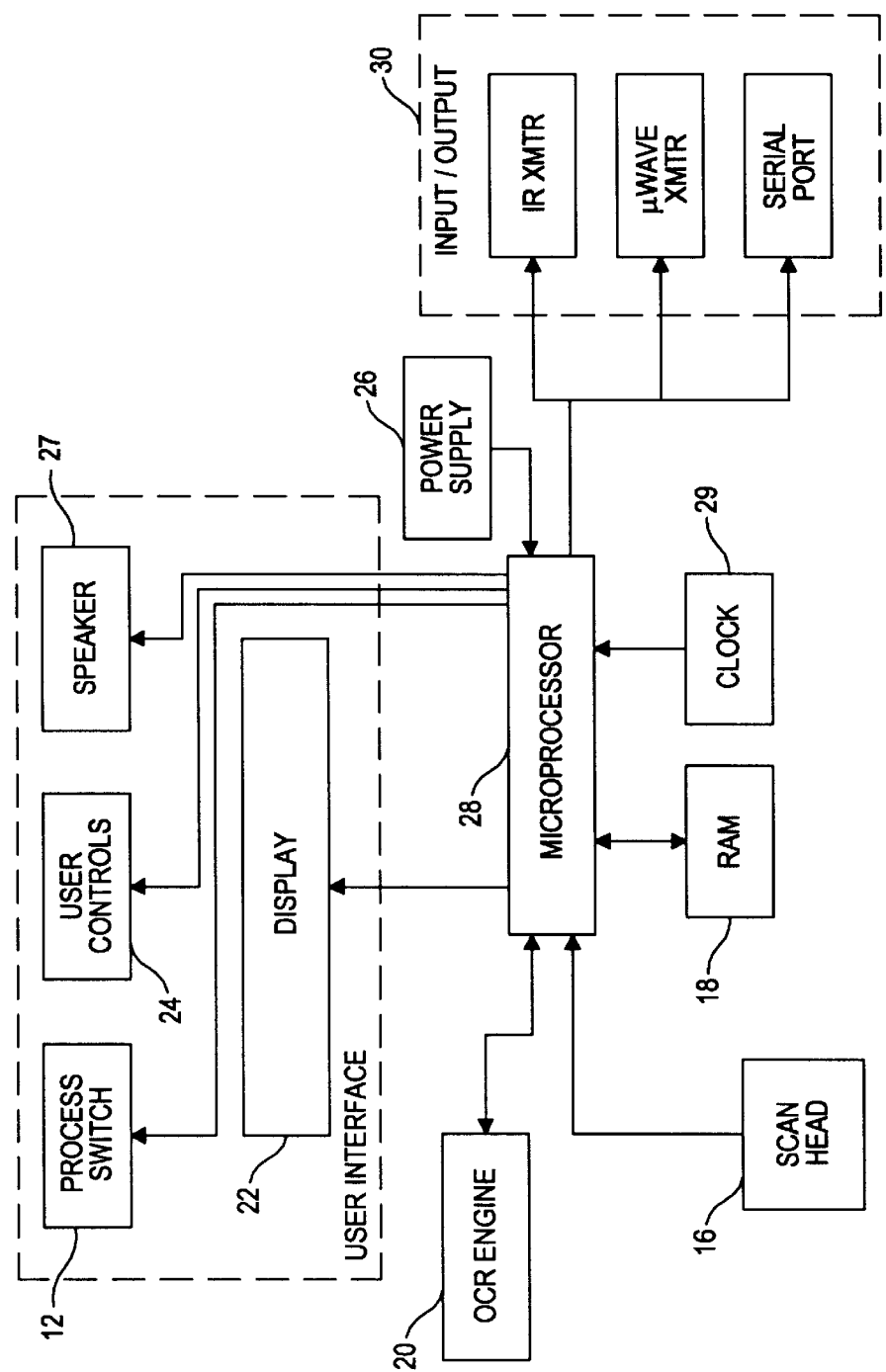
FIG. 3 is a block diagram of the components which make up the handheld scanner.

Illustrated in FIGS. 1 and 3 are the basic components which constitute the handheld scanner. In the embodiment of FIG. 1, the scanner is incorporated within a personal digital assistant (PDA) 10. Located on the exterior of the handheld scanner is a process switch 12 which initiates the start and end of a scan sequence. The scan is performed by sweeping the handheld scanner across printed media containing information of interest, such as an URL or a barcoded product identifier on a label. The scanning motion can be aided by an aiming an alignment strip of laser light emitted from a laser diode 14, or the like. Referring to another embodiment of the scanner illustrated in FIG. 2, the scanner is oriented so that the beam of light emitted by the laser diode is aligned along a line of text on printed media, to assure proper juxtaposition of the data relative to a scan head 16 at one end of the housing. In the illustrated embodiment, the laser diode is positioned on the left side of the housing, to facilitate right-to-left scanning. Alternatively, or in addition, a laser diode can be located on the right side of the housing, for left-to-right movement of the scanner. The scan head 16 consists of a CCD array of light sensing elements and a lens which uses ambient light to convert the optical image of the scanned image to electrical signals on a pixel-by-pixel basis.

Referring now to FIG. 3, a block diagram of the components of the handheld scanner is shown. The electrical signals generated by the CCD in the scan head 16 are stored in a RAM 18 as a complete image. The image is passed to a decoder, residing on a PROM 20. The decoder can be either or both of two basic types. In the case where the scanned image is text, the decoder is an OCR engine. The scanner is preferably designed to read and store limited types of information, and therefore the OCR engine can be optimized by using a limited dictionary to convert the scanned images to alphanumeric character strings. For instance, if the scanner is intended to be used only for URLs and e-mail addresses, the dictionary might store only the information necessary to recognize the lowercase letters and symbols that are employed in these types of identifiers. In the case where the handheld scanner is used to scan barcode labels and the like, the decoder is a bar code converter, which transforms the scanned images into alphanumeric data.

As alphanumeric character strings are recognized by the decoder, they are immediately displayed on an integrated LED/LCD display 22 for the operator to verify a correct scan via externally accessible operator controls 24. The user controls 24 also permit the user to scroll through the display, if the number of characters is larger than that which can be shown on the display at one time. If the scan is correct, the user actuates an appropriate one of the controls, and the character string is stored in the RAM 18, for subsequent presentation to a companion information-retrieval agent. Preferably, the RAM is of the non-volatile type, so that stored data is not lost even if an on-board power supply 26 should fail. If the scan is incorrect, through the use of the externally accessible operator controls 24 the character string is deleted and the apparatus is reset for re-scan. Thus, the user is able to immediately verify whether the printed information has been properly scanned and recognized, and take corrective action if necessary. Further in this regard, the scanner can include a speaker 27, or the like, which provides audible feedback to the user to indicate when the scanner is ready to begin a scan after the process switch 12 has been actuated, and/or to indicate when the results of a scan are so poor that the input image cannot be reliably decoded, e.g. the scanner was skewed relative to a line of printed text.

The scan head, decoder and other integrated circuits are controlled by means of a microprocessor 28 which is programmed with instructions to carry out the functions described herein. Many suitable microprocessors are available in the commercial marketplace to meet this need. To facilitate later cataloguing and retrieval of scanned information, the scanner can include a clock 29 which the microprocessor employs to stamp each stored entry with an associated date and time, which information is also presented to the information-retrieval agent.

The information-retrieval agent allows the user to view the scanned information and group by relevance, date and time, priority, or topic. Once initiated, the information-retrieval agent utilizes the Internet or other network connection to search for site information interpreted by the handheld scanner and presented to the companion software communications agent, and retrieves HTML, XML, WML, or VRML documents, e-mail messages, USENET news, Java applets, ActiveX documents, Active Server Pages or file transfers from the network address locations.

The information-retrieval agent can be embodied in a number of different forms. In one implementation of the invention, the handheld scanner works in conjunction with a separate communications device, such as a personal computer, to provide access to a remote source and retrieve information that is identified by the scanned image. For this purpose, the handheld scanner can contain one or more I/O ports 30, that permit the stored alphanumeric data to be transferred to a computer, or other type of communications device. In one embodiment of the invention, the user controls 24 allow the operator to transmit the data, using an infrared or RF transmitter, to a companion information-retrieval agent executing on a personal computer, network computer, electronic newspaper, television set-top box, or other type of communications device.

In another implementation of the invention, the handheld scanner itself has remote communications capabilities, and can directly access and display the remotely stored information. The information-retrieval agent includes an associated communications component in each of these two implementations. In yet another implementation where a limited amount of information is to be retrieved, such information can be directly stored in the handheld scanner, in which case remote communications capabilities are not required.

Figure 4:
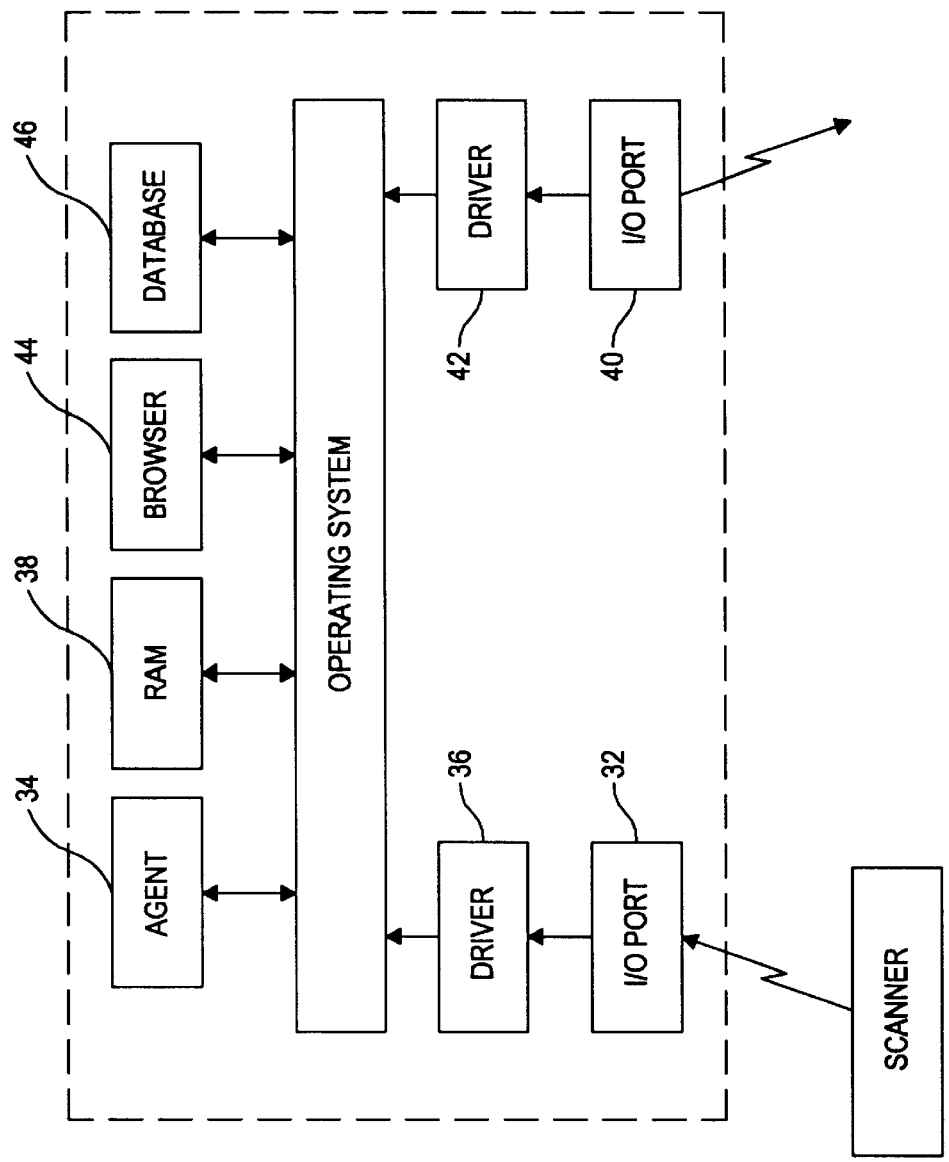
FIG. 4 is a block diagram of the architecture of the software system for a communications device on which the software communications agent is executing.
Figure 5:
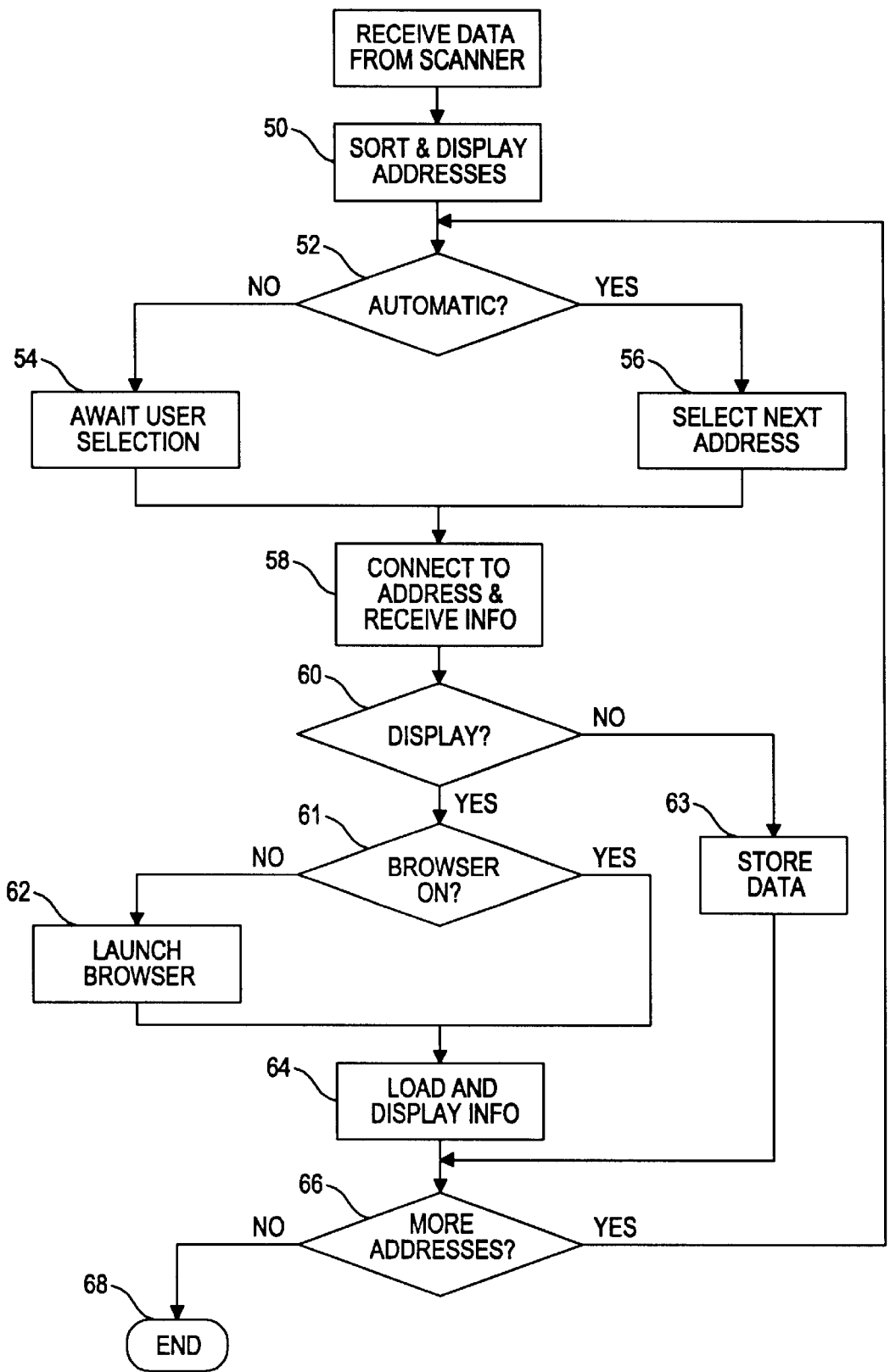
FIG. 5 is a flowchart depicting the operation of the software communications agent.

Referring now to FIGS. 4 and 5, the basic operation of the information-retrieval agent will be described in the context of the first implementation described above, where a separate communications device is employed. After verifying that the printed image has been properly scanned and converted into alphanumeric data by the handheld scanner, the user activates one of the control buttons 24 on the exterior of the scanner to transmit the alphanumeric data to a suitable communications device that is connectable to the Internet or other communications network. In one embodiment, the communications device might be a personal computer or network node. In other implementations, the communications device might be a television set-top box which provides Internet connection capabilities, or a handset for a personal communication system (PCS). The transmitted data is downloaded to the communications device through a suitable I/O port 32. The I/O port 32 is one which is capable of receiving data in the format transmitted by the corresponding I/O port 30 on the scanner. Thus, if data is transmitted using a wireless medium, such as IR light or RF signals, the port 32 is capable of receiving and interpreting such signals. Alternatively, if the I/O port 30 is a serial port, the corresponding port provides a hardwired link to the scanner, either directly or via a cable. The data received at the port 32 is passed on to a software communications agent 34 executing on the computer, via a suitable I/O driver 36, and stored in the computer's random access memory 38.

Preferably, the scanner has sufficient memory capabilities to store data pertaining to multiple information sites. Referring to FIG. 5, the site addresses are sorted by the agent 34 at step 50, pursuant to any criteria established by the user, and displayed for viewing on the computer's monitor, or the like. For example, the user may set a preference item to indicate that the addresses should be sorted in the order in which they are received from the scanner, which might correspond to the order in which they were originally scanned and time-stamped by the scanner. Alternatively, they could be sorted in alphabetical order, or according to any other user-selectable criteria.

Once an address has been received, the information-retrieval agent initiates a connection to a remote site, such as a world-wide web page on the Internet, via another I/O port 40 having an associated driver 42. When initiating the connection, the information-retrieval agent 34 can operate in either an automatic mode or a user-controlled mode. In the automatic mode, the agent controls the driver 42 to automatically establish a connection to a remote site whose address has been received from the scanner. In the user-controlled mode, the agent awaits input from the user before causing the connection to be established. At step 52, therefore, a determination is made whether the user has placed the agent in the automatic or user-controlled mode. If the automatic mode has not been selected, the agent awaits input from the user at step 54, namely the selection of one of the displayed addresses and a command to establish a connection to that address. Conversely, if the automatic mode has been selected, the first address in the sorted list is selected at step 56, and a connection is made to the remote site at that address, at step 58. To do so, the information-retrieval agent can run a script file, or the like, which launches the driver 42 and any other appropriate resources in the communications device to establish the appropriate connection. For example, in a personal computer, these resources might include a dial-up network facility if communications are to be established via a modem and telephone line.

Once the connection is established, the relevant information at the remote site is downloaded and stored in the communications device. For example, if the address pertains to a world-wide web site on the Internet, the downloaded information might comprise an HTML, XML, WML, or VRML document, or an applet in a platform-independent programming language, such as Java. Conversely, if the remote site is an e-mail server, the retrieved information can be e-mail messages which have been addressed to the user of the communications device.

The information-retrieval agent can operate in either of two modes. In a playback mode, the retrieved information is displayed to the user immediately upon receipt. In a storage mode, the retrieved information is stored for later viewing by the user at a time that may be more convenient. After the relevant information has been downloaded from the remote site, therefore, a determination is made at step 60 whether the agent is in the playback mode. If so, a check is made at step 61 whether a browser program 44, or other program for viewing and/or editing the downloaded data, is currently running. If not, the program is launched at step 62, and the downloaded information is then loaded into the application program and displayed to the user, at step 64.

If the agent is not operating in the playback mode at step 60, the retrieved data is stored on a hard disk or other local storage media, at step 63. If desired, the agent can issue a command to automatically store the address as a bookmark, so the user can easily connect to that site at a later time. Thus, with very minimal effort, the user is able to transfer an address from printed media to a communications device, and establish a connection to a remote site identified by the address to download relevant information from that site. If the user does not desire to view the downloaded information at that time, the agent can be configured to simply store the information at a designated location in a local non-volatile memory, for later retrieval and display. In this case, there is no need to launch the browser, or any other application program, as an immediate response to the downloading of the information.

After the information from the first site has been downloaded for display and/or storage, a determination is made at step 66 whether additional addresses remain on the display list. If so, the process returns to step 52, and either automatically connects to the next site on the list, or awaits further user input regarding the next address to which a connection should be made, depending on the operating mode. The process continues in this fashion, to establish a connection to each site about which information has been received from the handheld scanner, and download the relevant data from that site, to be immediately displayed to the user, and/or stored for subsequent retrieval and display. After a connection has been made to every site on the list, the process terminates at step 68.

It will be appreciated by those of ordinary skill in the art that the present invention can be embodied in other specific forms without departing from the spirit or essential characteristics thereof. For example, in the preceding description, the software communications agent itself establishes the connection to the remote site, and then presents the downloaded information to a browser program for viewing. As an alternative, the agent can simply launch the browser and provide the character data to the browser in a manner analogous to user input from a keyboard. In this case, the browser itself establishes the connection to the remote site and downloads the information, in the conventional manner.

In the arrangement illustrated in FIG. 4, the agent 34 is shown as being a program which is separate from the browser program. In an alternative implementation of the invention, the functionality of the software agent can be incorporated into a browser or other application program itself. In this implementation, the browser receives the character data directly from the scanner as a URL, and establishes a connection in the usual manner.

The preceding explanation of the invention was presented in the context in which information is downloaded from each remote site identified by the scanned text. The communications agent can also be configured to automatically upload information, such as a pre-designated file, to the addresses which are provided by the scanner. Further in accordance with the invention, the scanned data need not be text, i.e. printed characters. Rather, it can be some other form of identification, such as the universal product codes, e.g. bar codes, that are found on many consumer items. In this case, the with the information-retrieval agent includes a database 46. This database contains an URL, or similar such address data, for each product code, such as the home page for the product's manufacturer. In this case, the decoder of the scanner converts the scanned bar codes into corresponding numeric or alphanumeric codes. Upon the transmission of a scanned code from the scanner, the information-retrieval agent retrieves an associated address from the database, and then establishes the connection to the appropriate remote site.

With the expanding capabilities of personal digital assistants (PDA's) and other handheld devices, it is feasible to incorporate the functionality of the information-retrieval agent into the handheld device itself, to provide a stand-alone, single device system. For example, the handheld scanner can include a built-in browser that is capable of communicating over the Internet using TCP/IP, the Wireless Access Protocol (WAP) or the like. In this case, a wireless communication technology, such as one which conforms to the Bluetooth standard, can also be incorporated into the scanner, to provide a direct connection to the Internet or other information-access network. Alternatively, the scanner might be enabled to communicate via a two-way paging network to retrieve the desired data. The display 22 is capable of providing images of HTML, XML, WML and VRML pages received from the remote servers.

Figure 6:
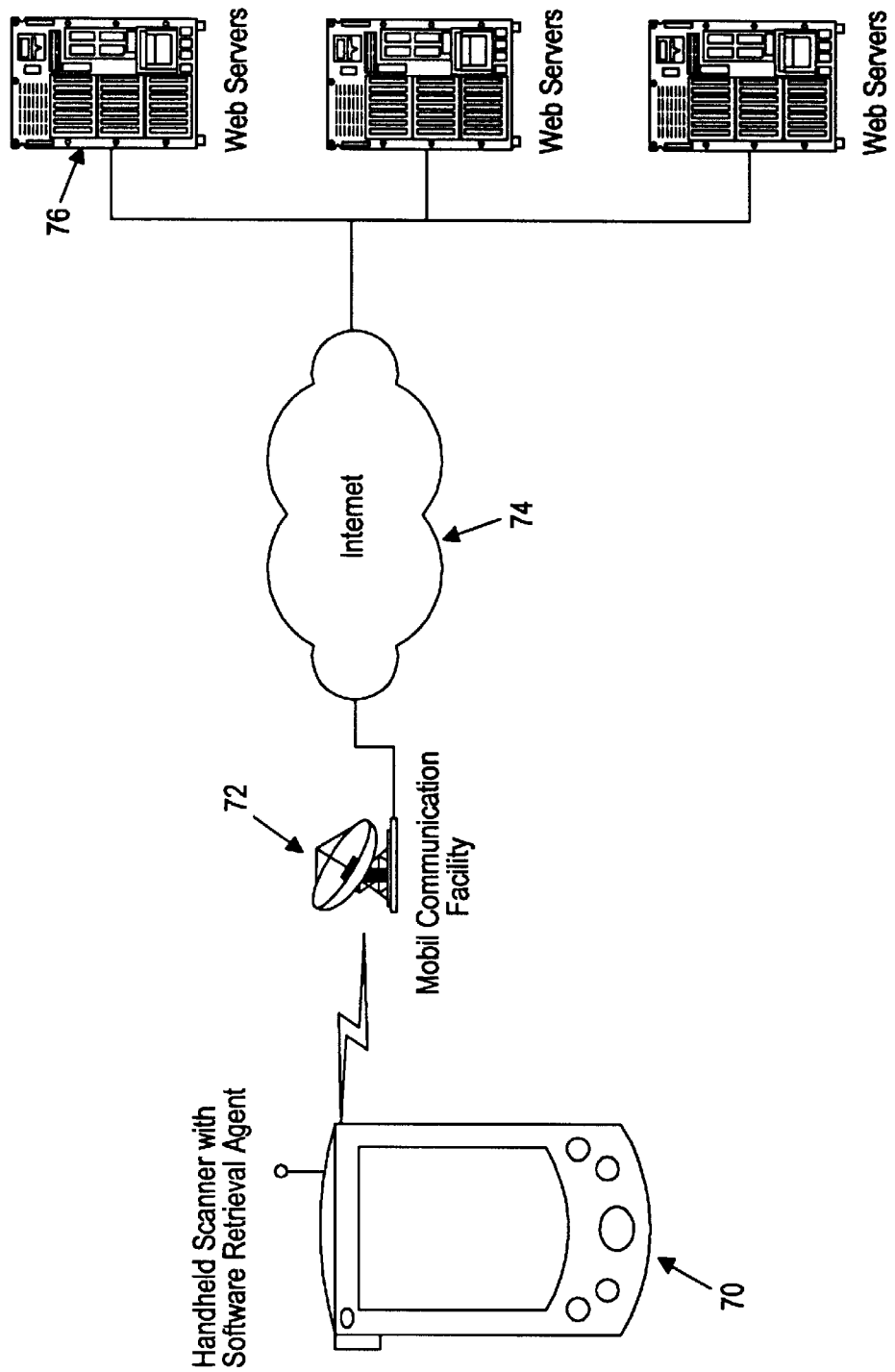
FIG. 6 is a schematic illustration of a self-contained embodiment of the invention.

FIG. 6 illustrates a preferrred embodiment of the invention wherein the handheld scanner incorporates the information-retrieval agent and wireless communications capabilities. In this case, once a URL, bar-coded label, or other item of identifying information has been scanned and decoded, it presented to an application program which initiates a connection to the site identified by the information. This application program might be a browser, or a Java applet, for example. The identification of the site may be provided either directly by the scanned information, or indirectly by means of an internal database. Using the wireless communication capabilities of the scanner 70, the application program connects the scanner to a terminal 72. For example, if the wireless communications are provided by means of a cellular telephone network, the terminal might be a base station. In turn, the terminal provides a connection to an information server 76, via the Internet or other information-access network 74. From there, the data associated with the scanned information is downloaded to the scanner, and displayed on its LCD display 22, for instance by means of a built-in browser.

The scanning and communication capabilities of the system of the present invention provide the ability to present the user with a variety of different types of information. At one level, it enables the user to connect directly to a remote web site and view the information presented at that site, simply by scanning a URL in printed text. In another application of the invention, by scanning a bar-coded label on a product, the system of the present invention enables the user to connect to a web site hosted by the manufacturer of that product, to obtain additional information about the product, or other products of that manufacturer. To facilitate such an application, the scanner can include an internal database which provides web site addresses that are associated with various product identifications. The internal database could directly provide the user with a limited amount of information about the product, e.g. suggested retail price. If the user desires additional information, a connection to the web site associated with that product can then be initiated.

As a further extension of this application, the scanner can be used to input information about a product to a buying service or the like. For instance, the user may be a member of an online group buying service, where items are purchased in multiples to obtain preferred pricing for the members of the service. When a product's bar-coded label is scanned, information about that product can be transmitted to the buying service, along with an indication of the user's desire to purchase that product. The information about the product which is transmitted might be obtained directly from an internal database in the scanner, or by first connecting to the manufacturer's web site and forwarding the information from there to the buying service. If desired, the buying service can add buyer's protection insurance, or other types of value add-ons, to the wholesale price of the product.

From the foregoing, therefore, it can be seen that the system of the present invention provides a convenient mechanism for users to obtain data that pertains to information that is encountered in a variety of everyday situations. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for automatically providing a user with remotely stored data that pertains to printed information, comprising the combination of:

a handheld scanner including a housing adapted to be held in the hand of a user and scanned over an image of printed information, and containing an image scanning device for converting optical images of information scanned by said scanner into electrical signals representative of the optical images, a memory for storing said electrical signals, a decoder for converting said stored electrical signals into alphanumeric information, a display unit providing a visual display of the alphanumeric information, a wireless transmission device for transmitting said alphanumeric information, and a set of user controls for manipulating the display and transmission of said alphanumeric information; and an information retrieval agent including a database that is stored in said scanner, that receives the alphanumeric information from said handheld scanner and initiates a connection via said wireless transmission device to a remote site that is associated with the alphanumeric information.

2. The system of claim 1, said wireless transmission device communicates with the communication network via the TCP/IP protocol.

3. The system of claim 1, wherein said wireless transmission device communicates with the communication network via the WAP protocol.

4. The system of claim 1, wherein said information retrieval agent includes a browser that is incorporated in said scanner.

5. The system of claim 1, wherein said information retrieval agent includes a java applet that is executed within said scanner.

6. The system of claim 1, wherein database provides a mapping between scanned information and remote sites that provide additional data relating to the scanned information.

7. The system of claim 1, wherein said scanner stores and transmits a unique identifier when transmitting and/or requesting information.

8. The system of claim 1 wherein the scanned printed information comprises text, and said decoder comprises an optical character recognition engine.

9. A system for automatically providing a user with remotely stored data that pertains to printed information, comprising the combination of:

a handheld scanner including a housing adapted to be held in the hand of a user and scanned over an image of printed information, and containing an image scanning device for converting optical images of information scanned by said scanner into electrical signals representative of the optical images, a memory for storing said electrical signals, a decoder for converting said stored electrical signals into alphanumeric information, a display unit providing a visual display of the alphanumeric information, a wireless transmission device for transmitting said alphanumeric information, and a set of user controls for manipulating the display and transmission of said alphanumeric information; and an information retrieval agent including a database that provides a mapping between scanned information and remote sites that provide additional data relating to the scanned information, for initiating a connection to a remote site that is associated with the alphanumeric information.

10. The system of claim 9, wherein said information retrieval agent is located on said scanner and initiates said connection via said wireless transmission device.

11. The system of claim 10, said wireless transmission device communicates with the communication network via the TCP/IP protocol.

12. The system of claim 10, wherein said wireless transmission device communicates with the communication network via the WAP protocol.

13. The system of claim 10, wherein said information retrieval agent includes a browser that is incorporated in said scanner.

14. The system of claim 10, wherein said information retrieval agent includes a java applet that is executed within said scanner.

15. The system of claim 10 wherein the scanned printed information comprises text, and said decoder comprises an optical character recognition engine.

* * * * *